(12) United States Patent
Lairson et al.

(10) Patent No.: US 6,995,950 B2
(45) Date of Patent: Feb. 7, 2006

(54) TRANSVERSE BIASED SHIELDS FOR PERPENDICULAR RECORDING TO REDUCE STRAY FIELD SENSITIVITY

(75) Inventors: Bruce Lairson, Los Altos, CA (US); Mark Nichols, San Jose, CA (US); Hai Chi Nguy, Milpitas, CA (US); Tim Glassburn, Milpitas, CA (US)

(73) Assignee: Maxtor Corporation, Longmont, CO (US)

(*) Notice: Subject to any disclaimer, the term of this patent is extended or adjusted under 35 U.S.C. 154(b) by 52 days.

(21) Appl. No.: 09/829,403

(22) Filed: Apr. 9, 2001

(65) Prior Publication Data
US 2002/0171982 A1    Nov. 21, 2002

(51) Int. Cl.
G11B 5/127    (2006.01)
G11B 5/39    (2006.01)

(52) U.S. Cl. .................................. 360/126; 360/319
(58) Field of Classification Search ............... 360/317, 360/319, 324.1, 126
See application file for complete search history.

(56) References Cited

U.S. PATENT DOCUMENTS

| | | | |
|---|---|---|---|
| 4,530,016 A * | 7/1985 | Sawazaki .................. 360/55 |
| 4,987,509 A * | 1/1991 | Gill et al. ................... 360/315 |
| 5,546,254 A * | 8/1996 | Gill ........................ 260/327.31 |
| 5,589,262 A | 12/1996 | Kiuchi et al. ................ 428/336 |
| 5,801,910 A | 9/1998 | Mallary ..................... 360/126 |
| 5,867,350 A * | 2/1999 | Haga et al. .................. 360/319 |
| 5,870,260 A * | 2/1999 | Davies et al. ................ 360/313 |
| 6,141,182 A * | 10/2000 | Amemiya et al. ........ 360/246.1 |
| 6,183,893 B1 | 2/2001 | Futamoto et al. ........... 428/694 |
| 6,195,233 B1 | 2/2001 | Akiyama et al. ........... 360/126 |
| 6,346,338 B1 * | 2/2002 | Watanabe et al. ........... 428/692 |
| 6,396,670 B1 * | 5/2002 | Murdock .................... 360/319 |
| 6,512,661 B1 * | 1/2003 | Louis ..................... 360/324.12 |
| 6,724,582 B2 * | 4/2004 | Funayama et al. ........ 360/324.1 |
| 2002/0135948 A1 * | 9/2002 | Funayama et al. ........ 360/324.1 |

FOREIGN PATENT DOCUMENTS

JP    11-86210 A   *  3/1999

OTHER PUBLICATIONS

Kuhn, Kelin J., Magnetic Recording—an introduction, EE 498, Mar. 26, 2001, pp. 1-15.

* cited by examiner

Primary Examiner—Jefferson Evans
(74) Attorney, Agent, or Firm—Tejpal S. Hansra (57) ABSTRACT

A method for reducing flux concentrating capacity of a shield in a magnetic read/write head positioned to read perpendicular residual magnetic fields on a magnetic media. Permeability of the shield is reduced in a direction oriented perpendicular to the magnetic media by inducing a transverse magnetic bias field within the shield.

21 Claims, 5 Drawing Sheets

TRANSVERSE BIASED SHIELDS FOR PERPENDICULAR RECORDING TO REDUCE STRAY FIELD SENSITIVITY

BACKGROUND OF THE INVENTION

1. Field of the Invention

The present invention relates, in general, to magnetic data storage, and, more particularly, to a read/write head and method for operating a read/write head to improve perpendicular recording performance.

2. Relevant Background

Magnetic recording is a predominant method for mass data storage, and is expected to remain a predominant method for the foreseeable future. Demand for hard disk drive capacity, for example, is doubling every year. There is continuous pressure to decrease the cost per byte of mass storage devices. As a result, magnetic storage device manufacturers strive to provide higher capacity and faster performance from hard disk drives.

At one time, capacity could be increased simply by providing more disks and more read/write heads in a single enclosure. However, space and power requirements make the prior practice of simply adding more disks and heads to a hard drive less and less effective. Hence, disk drive suppliers continue to increase areal densities, or the number of data bits per square inch of recording media, to meet the increasing demand for storage at competitive pricing. Read and write head design are key technologies needed to achieve these capacity increases.

Magnetoresistive (MR) head technology is used to provide high areal density. MR head structures include an MR element as a magnetic field sensor. A coil is formed above the read head and surrounded by a magnetic yoke that defines a write gap. The write gap is positioned over the MR element in an integrated structure. MR head technology uses separate read and write devices that allow each device to be optimized for one particular function (i.e., reading or writing data). Magnetoresistive devices or heads utilizing giant magnetoresistance (GMR) are of current technological interest to achieve high areal density recording. Magnetic field sensors based on the GMR effect are designed to measure or sense magnetic field strength. GMR sensors have greater output than conventional anisotropic magnetoresistive (AMR) sensors. GMR sensors directly detect the magnetic field rather than the rate of change in magnetic field (i.e., flux) therefore, they are useful as read heads for sensing data stored on magnetic media. The output of GMR sensors is frequency insensitive and the sensor produces an output even in a constant magnetic field. GMR devices are sensitive to small magnetic fields and because they are physically small, they promise higher areal density for magnetic storage devices. These factors make a GMR sensor a desirable choice for read heads.

Most conventional magnetic recording mechanisms use a longitudinal recording technique in which the magnetic field produced on the recording media is stored in the media surface and is oriented longitudinally. Longitudinal recording systems result in magnetic fields that are localized to the surface of the recording media and have been favored because media with longitudinally oriented magnetic particles have been easier to produce.

More recently, manufacturers are considering perpendicular recording systems in which the magnetic field produced in the media is oriented perpendicular to the media surface. Perpendicular recording promises data recording at much higher areal densities as the magnetic field is stored vertically within the media rather than simply on the media surface. Essentially, because the magnetic field indicating a bit of data is stored using the entire volume of the media rather than just the surface, significantly higher areal densities can be achieved.

However, perpendicular recording systems use a magnetically soft underlayer that require requires relatively low fields to become magnetized. As a result, perpendicular recording systems have been more sensitive to stray fields by a factor of 3 to 10 as compared with longitudinal recording. Perpendicular error rates are strongly affected for applied fields of about 10–15 Oersteds (Oe), as compared with 30–50 Oe for longitudinal recording.

Stray field sensitivity degrades performance in environments where ambient magnetic fields exist, such as in the vicinity of motors, electric currents, and magnets. For example, when disk drives are mounted in an enclosure in close proximity, the drive motors produce sufficient fields to interfere with adjacent disk drives. Fields outside of a drive can be in the range of 100-105 Oe, which can affect nearby drives. Similarly, nearby tape drives can produce significant stray magnetic fields. The increasing use of disk drives in devices such as televisions, automobiles, and portable computers promises increased demand for drives that have low stray field sensitivity.

It has been noted by the inventors of the present invention that the structures used in conventional read/write head devices, particularly in read/write devices for perpendicular recording, capture the stray magnetic fields and couple the stray magnetic fields to the recording media in an undesirable fashion. These structures include shields around the read head that are intended to block fields produced by neighboring portions of the recording media so that the read head reacts only to magnetic fields produced in an area directly under the read device. Similarly, the pole or poles in the write head are engineered to promote perpendicular fields, and consequently are sensitive to capturing stray perpendicular fields. Accordingly, a need exists for a recording system and a method for operating a recording system that reduce sensitivity to stray fields, especially in perpendicular recording systems.

SUMMARY OF THE INVENTION

Briefly stated, the present invention involves a method for reducing flux concentrating capacity of a shield in a magnetic read/write head positioned to read perpendicular residual magnetic fields on a magnetic media. Permeability of the shield is reduced in a direction oriented perpendicular to the magnetic media by inducing a transverse magnetic bias field within the shield.

In another aspect, the present invention involves a read/write head for a magnetic storage device comprising a shield comprising a magnetic material having an orientation selected to capture stray magnetic fields and a transverse magnetic bias field within the shield.

DETAILED DESCRIPTION OF THE PREFERRED EMBODIMENTS

The present invention is illustrated and described in terms of a perpendicular recording system because perpendicular recording systems with a soft underlayer are particularly sensitive to stray field degradation of the read and write processes. The particular loss in recording characteristics depend on the head and medium, but generally the soft magnetic underlayer greatly increases the flux-gathering properties of the head, causing more field to be concentrated at the read and write elements of the transducer. However, stray field sensitivity is a problem in horizontal recording systems to a lesser degree, and the teachings of the present invention are readily extended to such systems.

The present invention is illustrated with examples of a magnetic hard disk drive, however, the teachings are readily extended to other magnetic storage mechanisms such as magnetic tape storage. Tape drives differ from disk drives in the mechanisms that transport the media with respect to the read/write head, but use analogous magnetic read and write devices and so are encompassed by the teachings of the present invention.

Figures 1, 2:
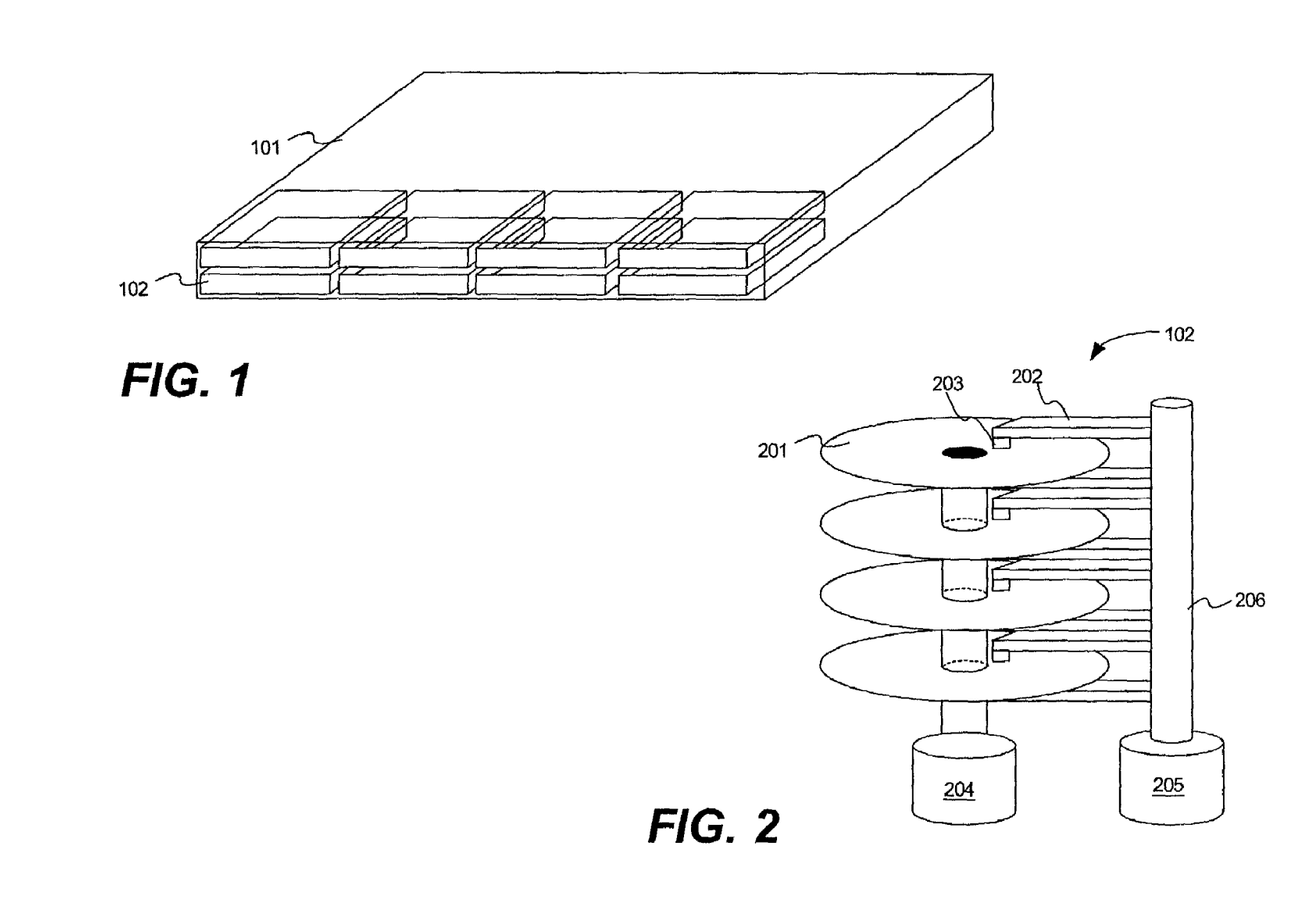
FIG. 1 shows a multi-drive data storage system in which the present invention is implemented.
FIG. 2 shows a simplified disk storage mechanism in which the present invention is implemented.

FIG. 1 shows a multi-drive storage device such as might be found in a high-end server or network attached storage (NAS) device. Such devices densely integrate hard disk drives and/or tape storage, typically using off-the-shelf IDE or SCSI storage devices 102 mounted in an enclosure 101. Because of the desire for high-density storage, storage devices 102 are mounted in extremely close proximity so that the magnetic fields produced by each drive 102 readily affect neighboring drives 102. Enclosure 101 also houses power supplies (not shown), motherboards (not shown), network connectivity boards (not shown), and other devices specific to a particular application, some of which may produce stray magnetic fields as well.

FIG. 2 illustrates some components of a typical disk drive 102. The components shown in FIG. 2 are not to scale to better illustrate features of the invention. In typical construction, all of the components are densely packed in an enclosure that allows stray magnetic fields to penetrate and affect all of the magnetic media 201 and read/write heads 203. Drives 102 include one or more magnetic media such as platters 201 shown in FIG. 2. In the preferred embodiments, platters 201 are manufactured to promote perpendicular recording by including a supporting substrate covered with a magnetically soft underlayer and a magnetic surface coating. The surface coating comprises a grain structure that promotes perpendicular storage fields. Any available technique and materials can be used to implement platters 201. In tape drive systems the media is implemented by a flexible tape having a magnetic coating.

Platters 201 are coupled together via a spindle to a spindle motor 204. Spindle motor 204 operates under control of control electronics (not shown) to maintain the spin speed of platters 201 in a carefully defined range. Spindle motor 204 is a contributing factor to stray magnetic fields produced by the drive, however. While manufactures can take steps to shield platters 201 with the single enclosure from the fields produced by motor 204, these field still do affect neighboring devices 102.

Read/write heads 203 are mounted via arm 202 to a servo position mechanism formed by spindle 206 and servo motor 205. These mechanisms cooperate to move the read/write heads from the inner to outer portions of each platter 201. Servo motor 205 must move very fast to provide low seek times (i.e. the time required to position the read/write head over a particular portion of platter 201. Because of this, servo motor 205 is typically implemented with a relatively powerful motor that produces a significant magnetic field. This magnetic field contributes to the stray magnetic fields affecting neighboring drives 102.

Read/write head comprises a giant magnetoresistive (GMR) read device in the preferred implementations. It is this GMR read device that is primarily affected by stray magnetic fields. This sensitivity is manifested by incorrectly determining the magnetic state of the platter 201 immediately under the read device. To a lesser extent, a write device within read/write head 203 that produces a magnetic field is also affected by stray magnetic fields which may be manifested as writing incorrect data onto platter 201.

Figure 3:
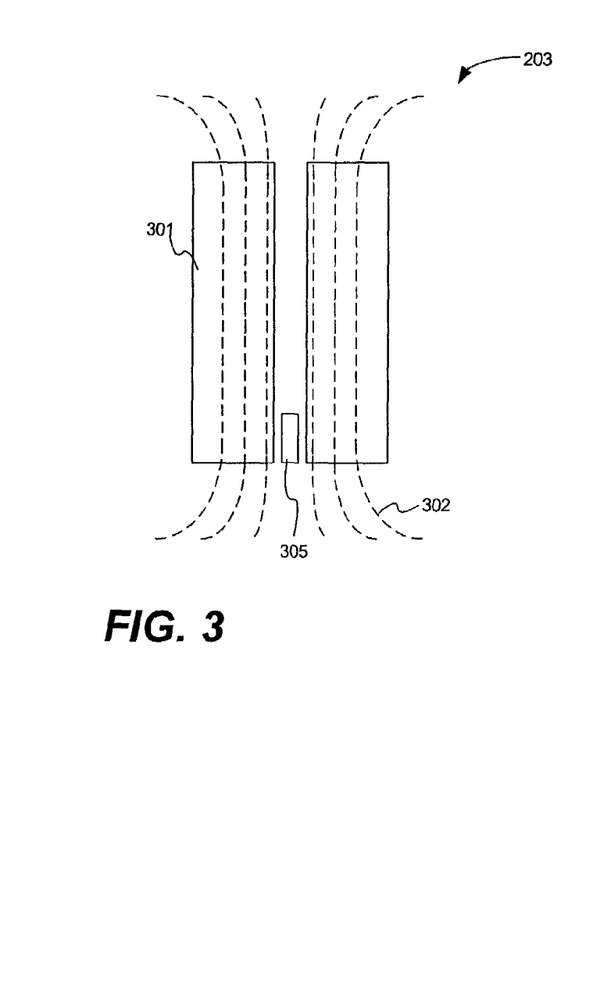
FIG. 3 illustrates a perpendicular recording mechanism and associated magnetic field properties in schematic form without media present.

FIG. 3 illustrates the read device portion of a perpendicular recording mechanism and associated magnetic field properties in schematic form without media (e.g., platter 201) present. A GMR element 305 is protected on either side by a shield 301. In practice, GMR element 305 and shields 301 are manufactured in an integrated structure and formed so that the lower portion of shields 301 and GMR element 305 form an air bearing surface that "flys" in proximity to a platter 201. Shields 301 are engineered to capture magnetic fields produced by adjacent portions of a media platter 201 so that GMR element 305 is responsive only to a small, focused portion of the media that is directly beneath GMR element 305.

Hence, shields 301 must be designed to capture perpendicular fields to prevent crosstalk with adjacent data tracks. Conventionally, shields 301 comprise magnetically soft material such as nickel-iron alloys (e.g., permalloy) and have a high permeability to perpendicular magnetic fields. However, because shields 301 capture perpendicular fields, they also capture stray magnetic fields produced external to the storage device 102.

Figure 4:
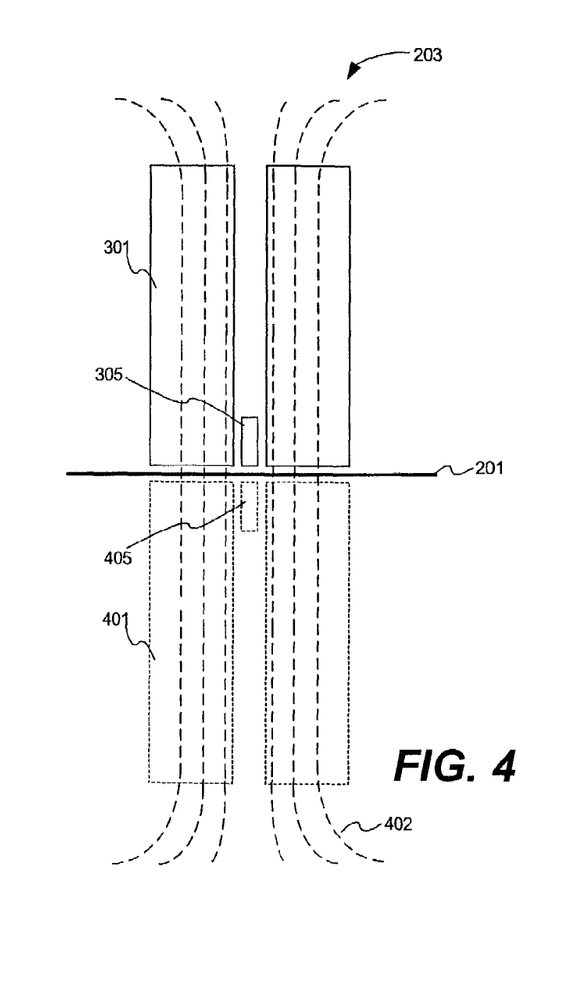
FIG. 4 illustrates a perpendicular recording mechanism and associated magnetic field properties in schematic form with media present.

As shown in FIG. 3, without the soft underlayer presented by the media, GMR element 305 is at the end of the magnetically soft shields 301. The demagnetizing fields 302 are large at this face because of the free poles that are formed at the shield air bearing surface faces adjacent to the GMR element 305. The cause of the increased sensitivity of GMR device 305 to perpendicular stray fields is the change in boundary conditions which the soft underlayer from the platter 201 imposes on the magnetic flux 302 escaping from the head. When the soft underlayer is in proximity to the ABS face, as shown in FIG. 4, image charges form in the soft underlayer, creating an image head comprising image device 405 and image shields 401. Thus, flux does not disperse from the bottom surface of the shields 301 as shown in FIG. 3, but instead is captured by the image shields 401 as shown in FIG. 4. The GMR element 305 sees a much greater concentration of the applied stray field, because the reluctance between the physical head 305 and image head is low, so that little of the flux 302 carried by the shield 301 disperses. In addition, the combined physical shield 301 and image shield 401 double the effective height of the shields, greatly increasing their flux gathering capacity.

It is desirable to decrease the flux gathering capacity of the shields, to reduce the stray field sensitivity to a level similar to longitudinal recording. One way to do this is to reduce the shield height to make the shape demagnetization factors similar to the case without the underlayer (i.e., reduce the shield height by 2×). Alternatively, the magnetic properties of the materials chosen to manufacture shields 301 may be engineered to tailor the flux gathering properties. These may be satisfactory approaches if other elements of the head design will permit such a change. In the case of the write element (not shown), such a change in geometry may be unrealizable because the need for forming the coils, yoke, and other structures constrains the ability to make changes to the physical size of components. Moreover, material changes tend to be difficult to incorporate in integrated structures and increase the expense of manufacturing.

In accordance with the present invention, the flux concentration properties of the soft magnet shields 301 can be reduced by reducing the permeability of the shields 301 in the vertical direction. This can be accomplished by three methods:

1) Applying a transverse bias flood field transverse to the head;

2) Exchange coupling the shields to a magnetic field generator; or

3) Inducing transverse magnetocrystalline anisotropy into the shield material through anisotropic stress or field annealing.

The first technique, applying a transverse bias flood field, involves generating an external transverse-oriented magnetic field in proximity with shields 301 using an external field generator. The external magnetic field may be provided by a permanent magnet comprising a ferromagnet or antiferromagnet oriented to produce a transverse-oriented field placed in proximity with the shields 301, for example. Alternatively, external magnetic field generator may be in the form of coils placed in proximity with the head with a switched or continuous AC or DC current flowing through the coils. The choice of materials, number of coils, power source and the like are selected to generate the desired magnitude of transverse magnetic field.

The second technique, exchange coupling, involves generating a transverse magnetic orientation that does not induce a bias field by field coupling, but instead causes magnetic bias through the direct exchange of electrons between the shield and the exchange bias material. This requires an electrically conductive physical contact between the shields and the exchange bias material. The exchange bias material is best arrayed as a layer adjacent to the shield, e.g. a physical layer deposited either on top of or prior to the deposition of the shield material during the wafer fabrication.

Exchange bias layers may comprise either ferromagnets, such as CoPt, FePt, oxides, or a great number of other hard magnetic materials. Exchange bias layers may also comprise antiferromagnets, such as nickel oxide, PtMn, IrMn, or other magnetic materials having zero net moment. Exchange bias layers may alternatively comprise ferromagnets, such as $Fe_2O_3$ and other materials forming subset of the ferromagnets. Exchange bias offers a greater range of design freedom than field biasing, because the exchange layer only directly affects the shields through electrical contact, and does not effect other magnetic elements, such as the read sensor, which might be affected by an applied magnetic field.

One potential advantage of exchange biasing is that it allows the shields to be biased in different directions. For instance, for the shields in FIG. 5, the two shields could be biased transversely but in opposite directions, by exchange biasing each shield to a separate exchange layer. If the exchange layers provide bias in opposite transverse directions, the resulting magnetization direction of the two shields will be in opposite directions. This "head to toe" arrangement of the magnetic flux in the shields is particularly stable.

The third approach involves inducing transverse magnetocrystalline anisotropy into the shield material through anisotropic stress or field annealing. It is known that a bias field can be induced in a magnetic material, such as that used to form shields 301, by applying physical or mechanical stress to the structure. Such stress can be created during formation of shields 301 and/or surrounding layers by, for example, controlling deposition temperatures and conditions. Subsequent thermal anneal processing can be used to induce stress, or adjust stress trapped in the structure to affect the level of transverse bias. Also, the bias levels in magnetic materials can be modified by thermal treatment in the presence of an external magnetic field. The thermal treatment causes particles within the material to align so as to produce a controlled bias field.

These techniques in accordance with the present invention may be used alone or in combination, and may be combined with alterations to the physical size and shape of shields 301 as well as the material properties of shields 301. While all of these techniques involve common processes in head manufacturing, only the first can be tested on already-assembled heads. Experiments have shown that the saturation field (i.e., the field at which the resistance begins to saturate) increases with the magnitude of the transverse bias field. This results in a "hardening" of the shields 301 to perpendicular fields. Experimental results presented in this specification have been obtained using the first technique, although it is contemplated that the second and third techniques, which are more consistent with high volume integrated manufacturing processes, are preferably modes of carrying out the invention in most circumstances.

Figure 5:
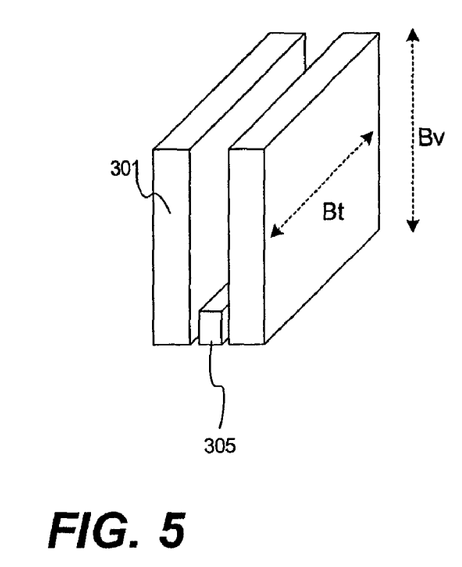
FIG. 5 illustrates transverse and perpendicular fields within a shielded read head structure.
Figure 6:
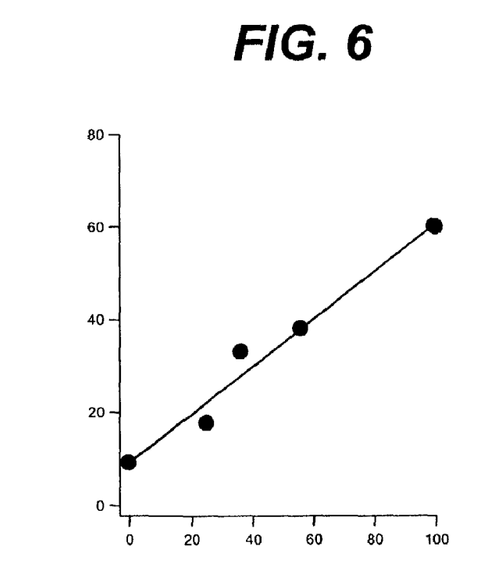
FIG. 6 shows a graph of a relationship between perpendicular saturation field (Oe) and applied transverse bias field (Oe)

FIG. 5 shows the geometry for the transverse bias field (Bt) applied to the shields while FIG. 6 illustrates a relationship between perpendicular saturation field (Oe), on the vertical axis and applied transverse bias field (Oe) on the horizontal axis for a number of applied fields. Aside from a small intrinsic saturation field associated with the shape and anisotropy of the head, the perpendicular saturation field rises substantially in proportion to the applied field. This is expected for a reduction of the permeability of the shields 301 in the perpendicular direction.

It should be noted that the observed effect is not related to the underlayer. The permeability of the underlayer to the perpendicular field is approximately 1, while the permeability in the transverse direction is approximately 10,000. Thus, the underlayer is unaffected by the perpendicular field, and is oriented by a transverse field of less than 10 Oe. This orientation is observed, for instance, by the quenching of underlayer domain spikes for a small transverse field. As will be discussed below, the effect on the shields occurs with transverse biases in the range of 30–300 Oe.

The degradation in error rate exhibited by conventional perpendicular recording systems is believed to be caused by transition shift. This can be attributed to two effects: upon writing, a bias field exists at the write element due to concentration of external flux, and upon reading, the GMR element 305 is biased away from its ideal operating point.

For instance, with no transverse field applied, experiments have shown that a 20 Oe perpendicular flood field saturates the head to one end of its sensitivity curve.

Figure 7:
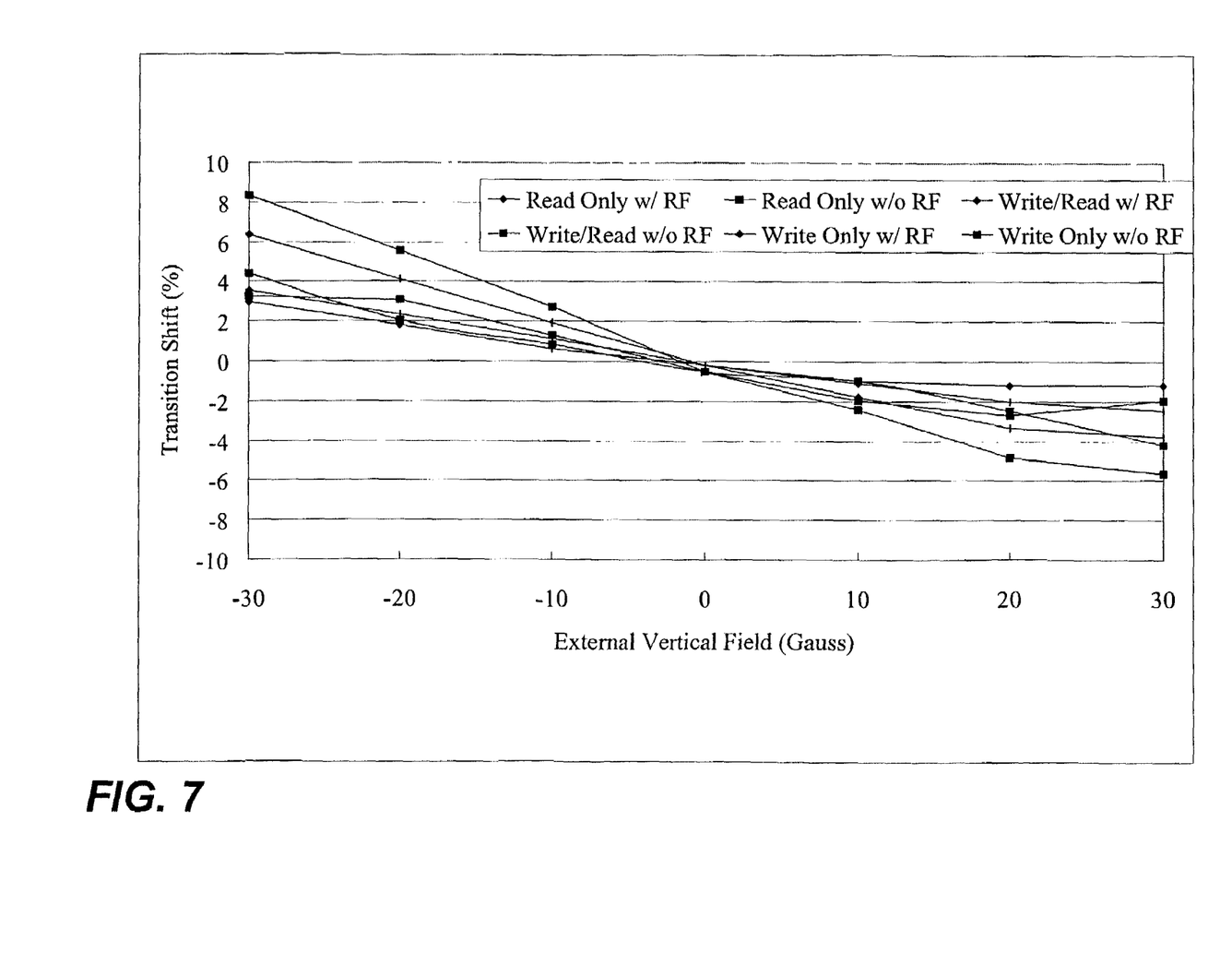
FIG. 7 graphically illustrates transition shift with a bias field applied in a variety of cases.

The measured transition shift can be separated into the components for writing and reading, by measuring transition shift with a bias field applied during write, during read, or during both write and read. This is shown for a probe head in FIG. 7. FIG. 7 illustrates six cases: write effect, read effect, and write+read effect, for both an 80 Oe applied transverse field and no applied field. Table 1 compares the magnitude of the transition shift with and without an applied field for each of the cases shown in FIG. 7. The read, write, and read+write effects are reduced by about 30% for an 80 Oe transverse field compared to the case of no transverse bias.

TABLE 1

|  | No Transverse Field | 80 Oe Transverse field applied |
|---|---|---|
| Read (%/Oe) | −.109 | −0.072 |
| Write (%/Oe) | −.131 | −.104 |
| Read + Write (%/Oe) | −.242 | −.176 |

Figure 8:
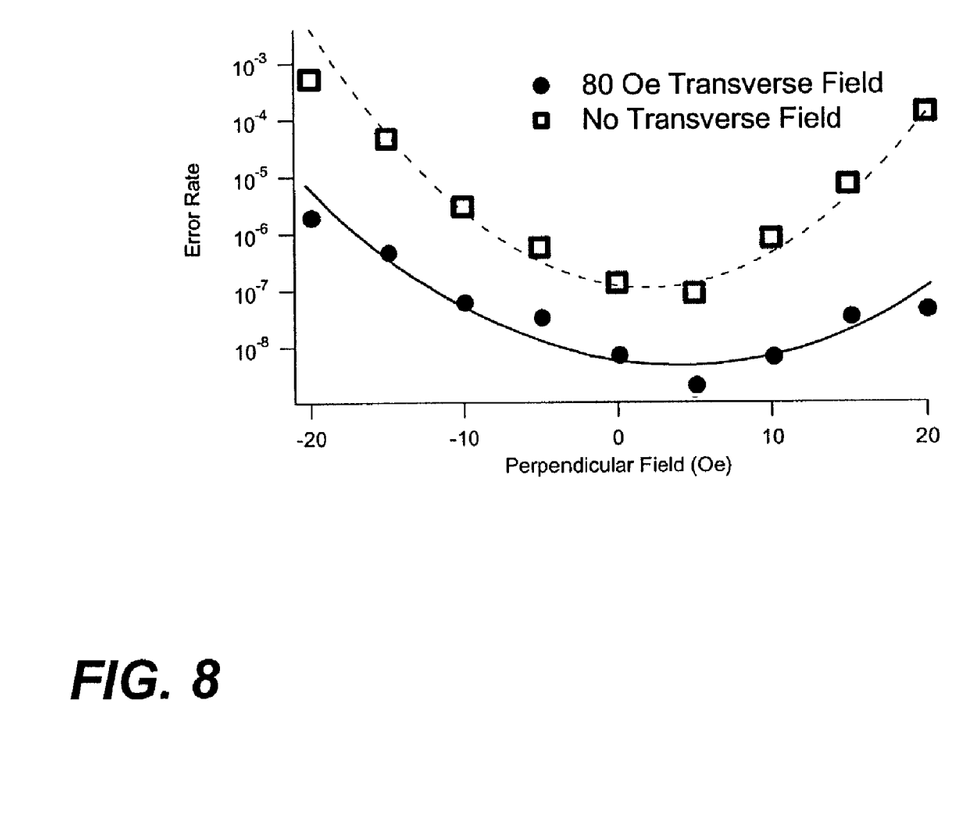
FIG. 8 shows a graph illustrating error rate versus perpendicular applied field for a sample read head device.

FIG. 8 shows the error rate versus perpendicular applied field for a sample head. It should be noted that, the error rate is improved in FIG. 8 by about one order of magnitude by the transverse field in this case, which is due to an improvement of signal-to-noise ratio, rather than reduced bit shift. A fit of the error rate to an inverse Gaussian indicates reduction in transition shift appears to be reflected in improved stray field sensitivity, aside from the improvement in signal to noise ratio. Interestingly, the error rate performance and the symmetry of positive and negative going pulses is usually best for some value of perpendicular applied field, which is head dependent.

It has been found that DC erasure of adjacent tracks can greatly affect the error rate of a given track. The DC erasure produces large regions that have a consistent magnetic polarity (i.e., DC flux). The high permeability underlayer is capable of carrying flux a distance of $\mu L$, where L is the thickness (about 0.3 microns) of the underlayer and $\mu$ is the permeability of the soft underlayer(about 1,000–10,000). Hence, read/write head 203 can be biased by flux originating from hundreds of microns away. This is a severe problem for perpendicular recording, since magnetic printing, servo, and disk erasure after certification all produce these large regions of DC flux, which cause transition shift and head instability.

The effect of adjacent track erasure is similar to the effect from applied fields, causing bit shift during the write and read operations. Transverse bias of shields 301 in accordance with the present invention greatly reduces their sensitivity to external sources of flux, including that arising from neighboring regions of DC flux. It has been found that for an appropriate applied transverse field, the sensitivity to this adjacent track erasure effect can be reduced. Some perpendicular field component may be required to move the head to the center of its operating range.

It has been found that head efficiency is not substantially affected by the reduced shield permeability created by the use of transverse bias in accordance with the present invention. Experiments indicate that the amplitude of the signal produced by a GMR read element is nearly unaffected by transverse bias fields up to 200 Oe. These experiments have also shown that the reduced permeability of the shields in the perpendicular direction does not affect their shielding characteristics up to transverse applied fields of at least 200 Oe.

It is contemplated that the present invention might be useful for longitudinal recording as well. For longitudinal recording, the error rate is far more sensitive to the application of a perpendicular field than to the application of a radial field. Thus, reduction of the permeability of the shields in the vertical direction is also expected to reduce the flux-gathering properties of the head. For low density head-media designs, the margin for error rate was large, typically three orders of magnitude or so. Thus, conventional drives could withstand substantial error rate loss before they no longer were able to recover user data. For drives in the future, it is expected that the error rate margin of the drive will fall significantly. Thus, the level of robustness of the head to stray fields provided by current designs may be insufficient in the future, and the present invention may be employed to improve the robustness to stray fields.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A perpendicular magnetic head comprising:
   a magnetoresistive read device positioned to read perpendicular residual magnetic fields on a magnetic media in proximity with the read device;
   a shield at least partially surrounding the read device comprising a magnetic material having an orientation selected to capture stray magnetic fields; and
   a transverse magnetic bias field within the shield.

2. The magnetic head of claim 1 wherein the transverse magnetic field is in the range of 30–500 Oe.

3. The magnetic head of claim 1 wherein the transverse magnetic bias is applied by exchange pinning technique.

4. The magnetic head of claim 1 wherein the transverse magnetic bias is applied by field anneal to induce magnetocrystalline anisotropy.

5. The magnetic head of claim 1 wherein the transverse magnetic bias is applied by stress-induced magnetocrystalline anisotropy.

6. The magnetic head of claim 1 wherein the read device comprises a giant magnetoresistive device.

7. A method for reducing flux concentrating capacity of a shield, said shield at least partially surrounding a magnetoresistive read device positioned to read perpendicular residual magnetic fields on a magnetic media, said method comprising:
   reducing permeability of said shield in a direction oriented perpendicular to said magnetic media by inducing a transverse magnetic bias field within said shield.

8. The method of claim 7, wherein said step of inducing a transverse magnetic bias field within the shield further comprises inducing said transverse magnetic field bias within said shield by an exchange pinning technique.

9. The method of claim 7, wherein said step of inducing a transverse magnetic bias field within the shield further comprises inducing said transverse magnetic field bias within said shield by field anneal to induce magnetocrystalline anisotropy.

10. The method of claim 7, wherein said step of inducing a transverse magnetic bias field within the shield further comprises inducing said transverse magnetic field bias within said shield by stress-induced magnetocrystalline anisotropy.

11. A perpendicular magnetic head for a disk drive with a magnetic media having perpendicular residual magnetic fields, said perpendicular magnetic head comprising:
- a shield associated with the magnetic media, said shield comprising a magnetic material having an orientation selected to capture stray magnetic fields; and
- a transverse magnetic bias field within the shield.

12. The magnetic head of claim 11 wherein the transverse magnetic field is in the range of 30–500 Oe.

13. The magnetic head of claim 11 wherein the transverse magnetic bias is applied by exchange pinning technique.

14. The magnetic head of claim 11 wherein the transverse magnetic bias is applied by field anneal to induce magnetocrystalline anisotropy.

15. The magnetic head of claim 11 wherein the transverse magnetic bias is applied by stress-induced magnetocrystalline anisotropy.

16. A magnetic data storage device comprising:
- a perpendicular recording medium;
- a read/write head, including a read element and a write element;
- drive electronics coupled to position the read/write head over selected locations of the perpendicular recording medium;
- a shield, at least partially surrounding the read element, comprising a magnetic material having an orientation selected to capture stray magnetic fields; and
- a transverse magnetic bias field within the shield.

17. The magnetic data storage device of claim 16 wherein the transverse magnetic field is in the range of 30–500 Oe.

18. The magnetic data storage device of claim 16 wherein the transverse magnetic bias is applied by exchange pinning technique.

19. The magnetic data storage device of claim 16 wherein the transverse magnetic bias is applied by field anneal to induce magnetocrystalline anisotropy.

20. The magnetic data storage device of claim 16 wherein the transverse magnetic bias is applied by stress-induced magnetocrystalline anisotropy.

21. The magnetic data storage device of claim 16 wherein the read head comprises a giant magnetoresistive device.

* * * * *